L. ALBRECHT.
VEHICLE WHEEL.
APPLICATION FILED MAR. 24, 1911.
1,189,223.
Patented July 4, 1916.
2 SHEETS—SHEET 1.
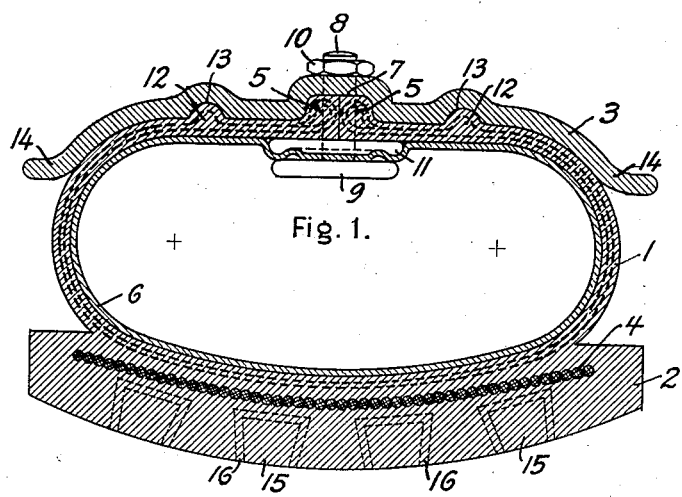
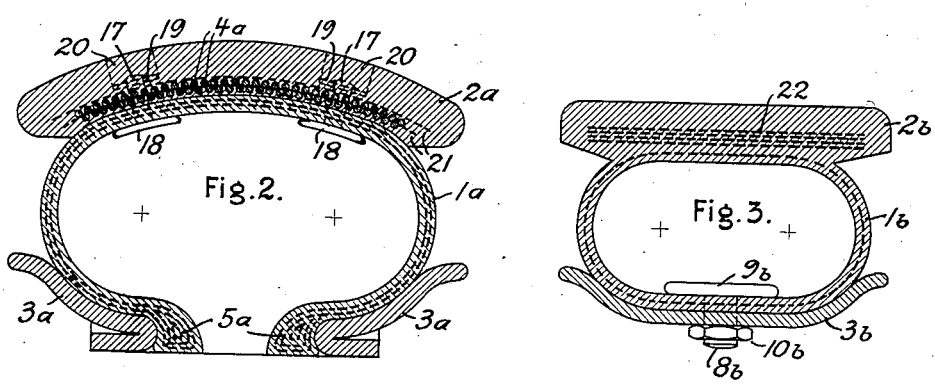
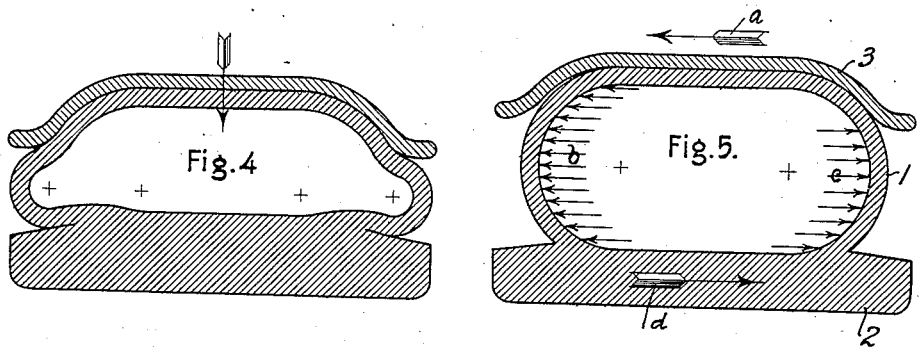
Witnesses.
Wm. J. Dolan
R. R. Murphy
Inventor.
Lewis Albrecht
per J. H. Freeman
Attorney.

L. ALBRECHT.
VEHICLE WHEEL.
APPLICATION FILED MAR. 24, 1911.

1,189,223.

Patented July 4, 1916.
2 SHEETS—SHEET 2.

Witnesses

Inventor
Lewis Albrecht
per J. H. Freeman
Attorney

UNITED STATES PATENT OFFICE.

LEWIS ALBRECHT, OF NEW YORK, N. Y.

VEHICLE-WHEEL.

1,189,223.  Specification of Letters Patent.  Patented July 4, 1916.

Application filed March 24, 1911. Serial No. 616,762.

*To all whom it may concern:*

Be it known that I, LEWIS ALBRECHT, a subject of the Emperor of Germany, and a resident of the borough of Brooklyn, city and State of New York, have invented certain new and useful Improvements in Vehicle-Wheels, of which the following is a specification.

This invention relates to a vehicle wheel, and more particularly to a pneumatic tire in combination with the rim of the wheel, an object of the invention being to provide a vehicle wheel having a pneumatic tire the maximum compression of which is limited approximately to the desired resiliency and which affords a large effective bearing surface in proportion to the volume of compressed air, thereby permitting the use of a low inflation pressure and a correspondingly low unit pressure upon the tread surface.

Other objects of the invention are to provide a pneumatic tire which has little liability to external injury and which is well adapted to resist lateral distortion and which affords an effective frictional grip between the tire and the road to prevent slipping and skidding.

These and other objects of the invention will in part be obvious and in part be more fully explained herein.

The invention consists in the novel improvements, combinations, features of construction, and parts herein shown and described.

One embodiment of the invention together with certain modifications thereof is illustrated in the accompanying drawings, which form a part hereof, the same serving in connection with the description to explain the principles of the invention.

Figure 6:
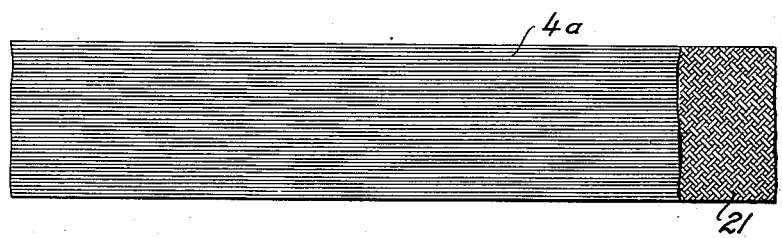
Figure 7:
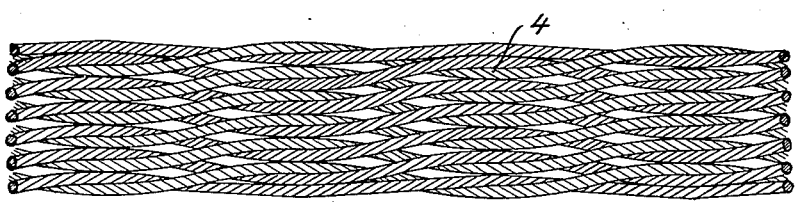
Figure 8:
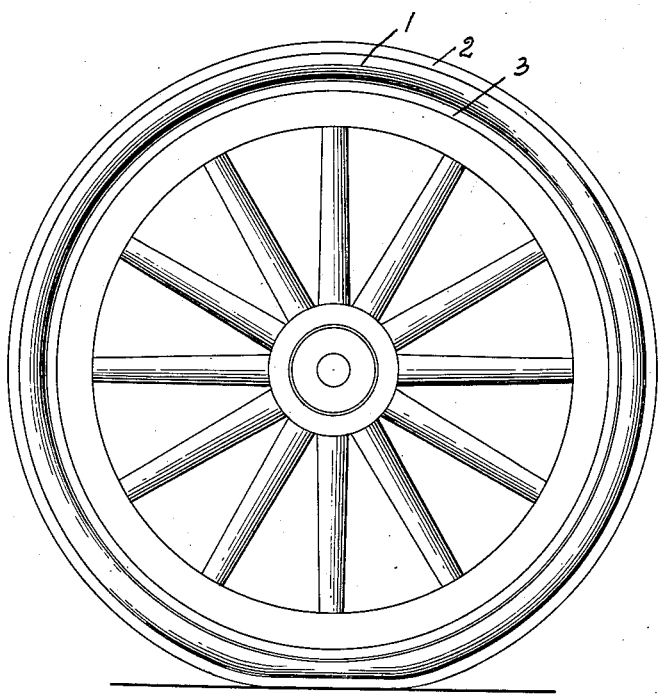

Of the drawings: Figure 1 is a sectional view of a wheel rim and tire constructed in accordance with the invention; Figs. 2 and 3 are similar views illustrating modifications; Figs. 4 and 5 are similar views, diagrammatic in character, illustrating the operation of a structure embodying the invention; Figs. 6 and 7 are plan views illustrating certain details; and Fig. 8 is a side elevation of a wheel embodying the invention.

A vehicle wheel embodying one feature of the invention comprises a rigid rim, and a pneumatic tire substantially elliptical in cross-section having a relatively thick tread portion and a relatively thin air-containing casing confined between the rim and the tread portion and retained thereby in a flattened condition, the rim and tread being coextensive transversely and extended laterally at the opposite sides of the casing to form supports for the sides of the casing when partly collapsed, that is, depressed by the weight of the load carried.

In the embodiment illustrated in Fig. 1 the relatively thin casing 1 is integrally united with a relatively thick tread portion 2 and is confined between this tread portion and a rigid wheel rim 3. In order that the casing 1 may be confined in a flattened condition between the tread portion and the rim, the tread portion has embedded therein flexible means which is practically inextensible circumferentially and is of such circumferential length as to compel the casing 1 to assume a flattened condition, and the tire as a whole to remain with its major axis in a horizontal plane parallel to the axis of rotation. As shown, this flexible inextensible member comprises a layer 4 formed by a circumferential winding of an attenuated material, such as wire or light wire cable or a cord or rope of fibrous material, the said layer having a width approximately equal to the length of said major axis and being embedded in the tread member 2, the body of which is preferably formed of a suitably flexible and elastic vulcanized rubber compound. The casing 1 is preferably formed of one or more layers of suitable inextensible fabric, such as canvas, embedded in a relatively thin body of rubber so as to afford the required resiliency or flexibility of the sides thereof and permit the same normally to recede from the edges of the tread and rim. As shown in Fig. 1, this casing is split along its inner circumference and is provided with thickened edges 5 and is rendered impervious to air by an inner tube 6. The proportions of the casing 1 with reference to the inextensible layer 4 and the rim 3 may be determined according to the load to be carried and to the resiliency desired but there would be little advantage in so proportioning the parts that the width of the casing in the lateral direction would be less than approximately once and a half the dimension in the radial direction, or approximately three times the radius of the curves which the sides of the casing naturally assume when the casing is inflated.

In order to enable the tire to effectively withstand side thrust, the rim 3 in accordance with one feature of the invention is made transversely concave, that is, grooved or formed at its opposite sides so as to inclose and approximately conform to the shape of the side of the casing 1. By reason of this construction it will be seen that forces tending to move the tread laterally with relation to the rim, as indicated by the arrows $a$ in Fig. 5, will act to bring one side of the casing 1 into contact with the adjacent side of the rim 3 and to move the opposite side of the casing out of contact with the opposite side of the rim. This will render the air pressure within the casing effective to resist the lateral thrust. That is to say, the air pressure acting in the lateral direction upon that part of the casing 1 which is moved away from the rim will be unbalanced by the internal pressure at the opposite side and, therefore, will be effective to resist the lateral movement of the tread with relation to the rim in the directions indicated by the arrows $a$. The effective lateral air pressures are indicated by the arrows $b$ and $c$ in Fig. 5.

In accordance with another feature of the invention, the rim 3 is provided along its central portion with a groove or depressed portion 7 in which the thickened edges 5 of the casing 1 are housed and retained by the air pressure. If desired, additional retaining means in the form of clamping bolts 8, having internal heads 9, may be provided, the shanks of these bolts being passed through suitable recesses in the adjacent edges of the casing and openings in the depressed portion 7 of the rim 3 and secured by nuts 10. Preferably and as shown, washers 11 are provided between the heads 9 and the casing, and the inner tube 6 is also clamped between the heads 9 and the washers 11. The lateral strain upon the casing 1 may be further resisted, if desired, by thickened portions or ribs 12 on the casing 1, which ribs are conveniently anchored in place by being recessed or fitted into corresponding grooved portions 13 in the rim 3. The rim 3 is extended laterally beyond the sides of the casing, preferably by having its lateral edges curved outwardly, as indicated at 14, to afford bearing surfaces for the sides of the casing 1, when the latter is partly collapsed, as indicated in Fig. 4, the tread member 3 being also extended laterally to form bearing surfaces for the outer portions of the curved sides of the casing 1 when the tire is partly collapsed, as also indicated in Fig. 4. The effect of this construction is to increase the lateral extent of the effective area acting to resist the collapse of the tire, the longitudinal extent of the area being also increased by the flattening of the tire where it bears upon the road or pavement, as indicated in Fig. 8. This construction also has the effect of protecting the relatively thin and flexible walls of the casing 1, which walls may thus be safely made quite thin and flexible, since they are fully covered in their compressed condition by the opposite edges of the tread and rim at both sides.

In order to increase the frictional grip of the tread of the tire upon the pavement, the tread is preferably provided with blocks 15 of frictional or antislipping material, such as granular corundum, carborundum, or equivalent material, and a suitable binding medium, these block being embedded in the rubber body of the tread. In order firmly to unite the blocks with the body of the tread, they are preferably provided with extended body portions to form a mechanical bond and incased in a relatively hard rubber compound, as indicated at 16, the blocks with their casing of relatively hard rubber being vulcanized with and thus integrally united to the body of the tread, in which they are countersunk. As the rubber surface of the tread is gradually worn away, the surface of the blocks will also be worn away and the sharp edges of fresh grains of the hard mineral substance brought into operation. Besides, the extended body portions of hard material, applied exteriorily to the tread, coöperate with the interior web or layer 4, of wire and other puncture resisting material previously described, in stiffening the tread within and without, all around the casing, in parallel planes concentric with the axis of rotation.

The modification illustrated in Fig. 2 embodies the same elementary features of construction as the form illustrated in Fig. 1. In the construction of Fig. 2, however, the casing $1^a$ is not integrally formed with the tread member $2^a$ but is united therewith by rivets 17 which have heads 18 engaging the inner surface of the casing $1^a$ and at their outer ends engage washers 19 in recesses 20 formed in the tread member 2, which recesses may or may not be filled with rubber composition or with blocks of frictional material similar to the blocks 15 already described. In the construction illustrated in Fig. 2 a tread member is illustrated as being provided with a plurality of layers of a flexible and circumferentially inextensible material. These layers may include circumferential windings of wire cord $4^a$, etc., and alternate circumferential windings of fabric 21, conjointly held in place between the tread and casing by the said rivets 17. Preferably the fabric is so applied that the threads extend diagonally with reference to the circumference of the tire in opposite directions, as shown at the right in Fig. 6, these threads being thereby well adapted to withstand any shearing strains in the tire or to transmit circumferential strains from one side of the tire to the other side. The circumferential windings of the attenuated material both in this form and in the form illustrated in Fig. 1 are preferably interlaced or braided in a manner like or similar to that indicated in Fig. 7 so that the longitudinal strains upon the wires or cords will tend to hold them closely together and strongly resist any force tending to spread them laterally. In this way the tire is rendered highly resistant to penetration by sharp objects. According to the mode of construction exemplified in Fig. 2, the rivets 17 fill the office of the extended portions of hard material hereinbefore described, and further afford a ready means of staying the layers 4ª and windings 21 on opposite sides, around the peripheral surface of the inflatable tube or casing.

In the form shown in Fig. 2 the rim 3ª is represented as made of two parts which are intended to be independently fastened upon the rim of the wheel so as to form a relatively wide recess in which the thickened ends 5ª of the casing 1 are located.

The modification illustrated in Fig. 3 includes the same primary features as those illustrated in Figs. 1 and 2. In this form, however, the casing 1ᵇ is of the single tube type and is preferably integrally united with the tread member 2ᵇ and provided with clamp bolts 8ᵇ, having internal heads 9ᵇ and nuts 10ᵇ for securing it to the rim 3ᵇ. In this form the tread 2ᵇ is represented as having embedded therein a plurality of circumferentially extending layers 22 of flexible inextensible material which may consist either of fabric or metal or other suitable flexible and substantially inextensible material. Where fabric is employed one or more of the layers are preferably arranged with their treads extending diagonally, as indicated in Fig. 6, for the reasons above pointed out.

It will be understood that the invention in its broader aspects is not limited to the particular constructions herein illustrated and described, as many changes may be made in the details thereof without departing from the main principles of the invention and without sacrificing its chief advantages.

I claim:

1. A vehicle wheel including in combination, a laterally extended rim, and a pneumatic tire substantially elliptical in cross-section laid flatwise inside the edges of said rim, said tire comprising a relatively thin air-inflated casing normally receding from said edges on opposite sides, a relatively thick tread around said casing having its edges projected outwardly opposite the edges of the rim, forming therewith four points of support for the sides of the casing in their extended condition, and means operating to limit the movement of the tread in relation to the rim so as to keep the casing confined between the respective edges thereof at all times.

2. A vehicle wheel including in combination a rigid rim, and a pneumatic tire substantially elliptical in cross-section placed thereon with its major axis in a horizontal plane, said tire comprising a relatively thin casing with thickened portions on the inner face thereof recessed in said rim, a relatively thick resilient tread on the outer face of said casing made to project beyond the opposite sides of the latter in their extended condition, and means serving to limit the movement of said tread laterally in relation to the casing on the supporting rim.

3. A vehicle wheel including in combination a rigid rim, and a pneumatic tire substantially elliptical in cross-section placed thereon with its major axis extending in a horizontal direction, said tire comprising an air-inflated casing normally receding from the edges of said rim, a resilient tread on said casing extending laterally therefrom oppositely to said edges, combined layers of substantially inextensible attentuated material and of diagonally threaded fabric circumferentially wound about the casing inside said tread to a width approximately equal to said axis, and means for staying said layers along the tread and casing at opposite sides.

4. A vehicle wheel including in combination a rigid rim, and a pneumatic tire substantially elliptical in cross-section disposed around said rim with its major axis parallel to the axis of rotation, said tire comprising an air-inflated casing of less width normally than that of the rim, a resilient tread on said casing sufficiently extended out laterally therefrom to cover the same in its compressed condition, said tread having embedded therein a layer of circumferentially wound substantially inextensible attenuated material with strands interlaced to resist spreading when under tension, and means securing the opposite sides of said layer to the tread and casing at points within the length of the major axis of the latter.

5. A vehicle wheel including in combination a rigid rim, and a pneumatic tire substantially elliptical in cross section arranged therearound with its major axis in a horizontal plane, said tire comprising an air-inflated casing normally exceeded in width by said rim, and a resilient tread co-extensive transversely with the rim adapted to cover the sides of said casing when in a depressed condition, said tread having embedded therein a plurality of layers of circumferentially wound substantially inextensible attenuated material, each layer having its strands interlaced to resist spreading under tension, the strands of adjacent layers being staggered with relation to each other, and the several layers being fastened along their opposite sides intermediate the tread and casing, within the length of said major axis.

6. A vehicle wheel including in combination a rigid rim, and a pneumatic tire substantially elliptical in cross-section laid flatwise thereon, said tire comprising an air-inflated casing normally receding at the sides from the edges of said rim, and a resilient tread on said casing projecting laterally therefrom opposite said edges to the extent required to cover the casing when depressed, said tread having embedded therein a layer of fabric with its threads extending diagonally, another layer of wire wound circumferentially with its strands interlaced, and means holding said layers in their respective positions along opposite sides thereof intermediate the casing and tread.

In testimony whereof, I have signed my name to this specification, in the presence of two subscribing witnesses.

LEWIS ALBRECHT.

Witnesses:
 WM. J. DOLAN,
 R. R. MURPHY.